United States Patent [19]

Harley

[11] Patent Number: 4,984,926
[45] Date of Patent: Jan. 15, 1991

[54] CONNECTOR FOR SECURING FURNITURE PANELS AT RIGHT ANGLES TO ONE ANOTHER

[75] Inventor: David N. Harley, Dorset, England

[73] Assignee: Titus Tool Company Limited, Buckinghamshire, England

[21] Appl. No.: 447,474

[22] Filed: Dec. 7, 1989

[51] Int. Cl.$^5$ .......................... B25G 3/00; F16B 7/08; F16B 37/00

[52] U.S. Cl. .......................... 403/8; 403/231; 403/407.1; 411/104; 411/108

[58] Field of Search ............... 411/104, 105, 107, 112, 411/113, 174, 175, 108; 403/7, 8, 407.1, 231; 217/65

[56] References Cited

U.S. PATENT DOCUMENTS

| | | | |
|---|---|---|---|
| 4,060,949 | 12/1977 | Busse | 403/231 |
| 4,089,614 | 5/1978 | Harley | 403/231 |
| 4,810,127 | 3/1989 | Hettich | 403/231 |
| 4,826,345 | 5/1989 | Salice | 403/231 |

OTHER PUBLICATIONS

Excerpt of catalog published by assignee "KD System 4", (no date).

Sketch by assignee depicting a securing device.

Primary Examiner—Neill R. Wilson
Attorney, Agent, or Firm—Lowe, Price, LeBlanc, Becker & Shur

[57] ABSTRACT

A device for securing furniture panels at right angles to each other includes a holding member including a plug portion which is positioned in a recess in a major surface of a first panel. The plug has a front wall which is exposed at one edge of the panel and positioned substantially flush with the panel edge. A chamber extends perpendicular to the edge of the panel through the full length of the plug from a first opening in the front wall to a second opening opposite the front wall. The chamber retains a screw within the body of the plug. A top wall of the plug is exposed at the major surface of the panel and has an opening extending into the body portion of the plug to enable tightening of a screw to engage a second, substantially perpendicular, second panel and draw the second panel toward the edge of the first panel. The screw can be inserted either through the top opening or through an opening opposite the front wall of the plug prior to insertion of the plug into the panel recess.

7 Claims, 2 Drawing Sheets

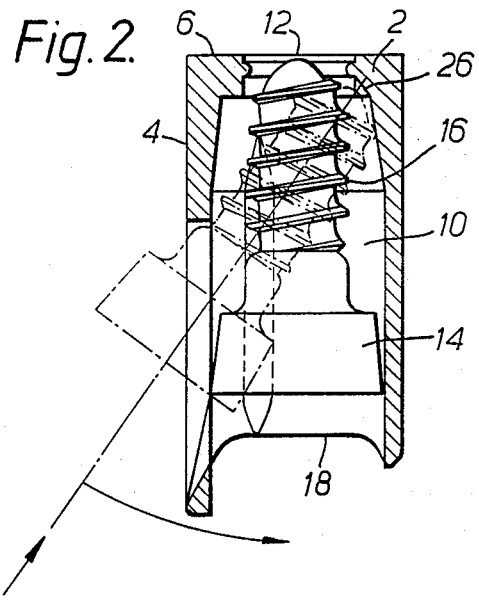
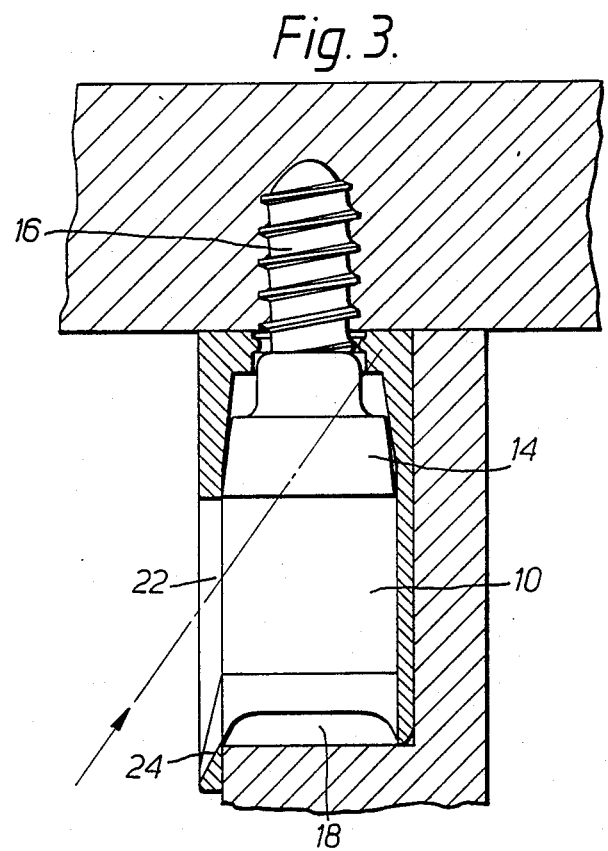

CONNECTOR FOR SECURING FURNITURE PANELS AT RIGHT ANGLES TO ONE ANOTHER

This invention relates to devices for securing furniture panels.

In particular it relates to the type of devices which are used to secure two panels at right angles to one another, the edge of one panel being in contact with a major surface of the other panel.

A first known device of this type comprises a body portion made of a plastics material which has a bottom surface, and surrounding wall portions substantially perpendicular thereto. The top of the body portion has a generally open structure enabling a securing member in the form of a screw to be inserted in the body portion substantially parallel to the bottom thereof. The body portion is adapted to be fitted in a recess in a major surface of one of the panels to be joined. A front wall portion of the body portion is positioned substantially flush with an edge of the panel, and is adapted to allow the screw to be driven through it to engage the second panel, whilst retaining the screw head within the body portion of the securing device. When the joint is tightened the two panels are drawn together. The device may be provided with a separate cap adapted to cover its open top after insertion and driving of the screw.

Such prior art devices are weak. Although they are adequate for fixing non-structural panel members of an item of furniture in place, for example shelves, they do not provide a strong enough joint to be used for fixing together major structural components of assembly furniture.

Another prior art device of the same general type has a plug-like body portion which has both a top and a bottom wall which are connected by surrounding walls. The body portion of this securing device is also adapted to be fitted in a recess in a major surface of a panel, with a front wall positioned flush with an edge of the panel.

This type of device is stronger than that described above, but has the disadvantage that insertion of the screw is more complicated. The body portion of the device is provided with a hinging capability allowing a screw to be inserted when it is open, and arranged to be snapped shut with the screw in position before insertion in the recess in the panel surface. An opening is provided in the top wall of the body portion through which the tip of a screwdriver can be inserted at an angle to the screw axis to drive the screw.

A suitable screw for use in this and the previously described prior art devices, is one which is adapted to be driven at an angle to its axis. An example of this type of screw is described in European Patent No. 0 112 030. The need to drive the screw at an angle to its axis arises because it is preferable for the screw to be parallel to the plane of one panel and perpendicular to the plane of the other to form a strong joint. In achieving this arrangement there is no access to drive the head of the screw from a direction coincident with the screw axis, in the normal way.

The second type of prior art device described above is inherently strong, but has the disadvantage of being relatively complicated, and therefore costly, to make. The unit cost can be reduced by the use of cheaper types of screws, but this gives rise to further problems as cheaper screws have a greater tendency to break whilst being tightened during assembly of furniture, or if the panels are subjected to forces tending to move them laterally with respect to each other. A broken screw could only be removed, and a new one inserted, by taking out the whole of the securing device. This almost inevitably leads to damage of the panel in which the device has been positioned, and usually results in damage to the walls of the recess so that it is no longer capable of anchoring a replacement securing device. The panel thus becomes unusable.

The invention aims to overcome, at least in part, some of the disadvantages of the prior art outlined above.

According to the invention there is provided a securing device for securing panels at right angles to each other, comprising a holding member adapted to be fitted in a recess provided in a major surface of one of said panels, said holding member comprising a plug-like body portion having a front wall arranged to be exposed at an edge of said one panel and positioned substantially flush therewith, said front wall having an opening therein extending axially in the body portion away from the front wall and defining a chamber adapted to retain a securing member within the body portion, the holding member also being provided with a top wall arranged to be exposed at a major surface of the panel and having an opening therein extending into the body portion and connecting with said chamber, the opening in the top wall being adapted to enable insertion of the securing member in the chamber and provide access for driving the securing member to engage the second panel, and draw it towards the first panel.

A securing device in accordance with the invention enables a securing member in the form of a screw to be inserted or removed whilst the body portion remains in position in the recess in the panel surface, and also provides an inherently strong joint.

In order that the invention may be more clearly understood a preferred embodiment will be described with reference to the accompanying drawings, in which:

FIG. 2 is a sectional view taken along the line A—A' in FIG. 1 and showing a screw in position in the device, and in a position for insertion.

FIG. 3 is a sectional view also taken along the line A—A' in FIG. 1 but showing the two panels which are joined, the screw being in its driven position.

Figure 1:
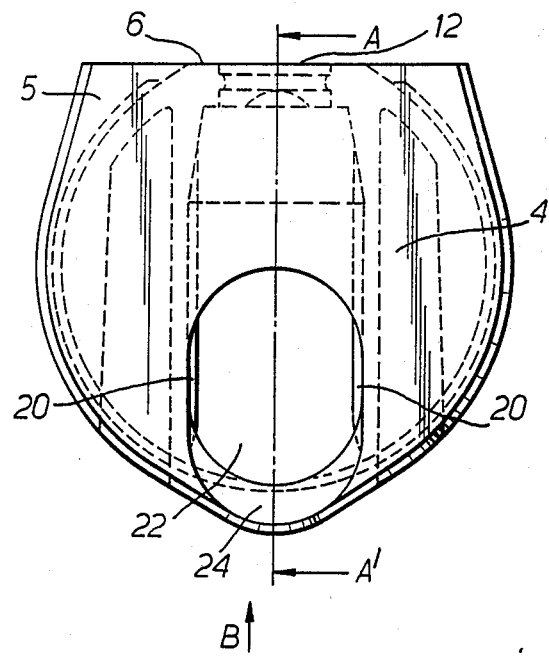
FIG. 1 is a plan view of a securing device according to the invention.
Figure 4:
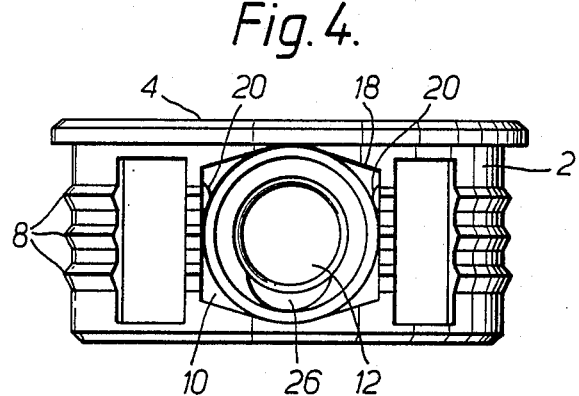
FIG. 4 is an end view of the securing device of FIG. 1, looking in the direction of arrow B.

The securing device of the preferred embodiment consists of a plug-like body portion 2 made of a suitable plastics material and having a top wall 4 which projects slightly beyond the side walls of the plug-like body in the form of a flange 5. This flange is more pronounced towards the front edge of the top wall 4. It serves to locate the body portion 2 at a suitable depth in a recess formed in the surface of a panel, and provides a neat finish by covering the edges of the recess when the body portion is in position.

One of the walls of the body portion 2 is flat and forms a front wall 6 which is fitted flush with an edge of the panel 19 in which the securing device is positioned. The other wall is generally arcuate, so that the plug has an overall cylindrical shape. The outer surface of the arcuate wall is provided with a series of circumferential ribs 8 which serve to anchor the body-portion 2 securely in the recess into which it is inserted.

The plug-like body portion 2 of the securing device is substantially hollow and has a chamber 10 within it defined by an opening 12 in the front wall 6 which extends axially into the body portion 2 and substantially perpendicular to the front wall 6. The bore of the chamber 10 is larger than the diameter of the opening 12 so that the head 14 of a screw 16 within the chamber 10 is retained inside the body portion 2, when the screw 16 is driven along the chamber axis.

In the described embodiment the chamber 10 extends across the full diameter of the body portion 2 from front to back of the device and forms an opening 18 in a portion of the arcuate wall opposite the front wall 6. This opening enables the screw 16 to be readily dropped into the chamber 10 during the production process of the securing device. Longitudinal ribs 20 are provided on the inner side walls of the chamber 10, towards the top of the body portion 2. These serve to locate and retain the screw 16 in position in the chamber 10 when the securing device is in transit.

An opening 22 is provided in the top wall 4 of the body portion 2, which connects with the chamber 10 so that a screw 16 can be inserted into the chamber 10 through the top wall 4 of the body portion 2. To make this insertion easier the rear edge of the opening 22 has a chamfer 24 providing more room for the screw to move into the chamber 10, and also enabling a screwdriver to be more easily positioned correctly for driving the screw through the chamber 10. A portion 26 of the wall of the chamber 10 adjacent the opening 12 in the front wall 6 of the body portion 2, and in line with the axis of the screw 16 when it is inserted through the top wall 4, is also chamfered to give room to allow the screw 16 to pivot into the chamber 10 to a position in which its axis lies along the axis of the chamber 10.

The provision of the opening 22 in the top wall 4 firstly allows access for driving the screw with a screwdriver placed at an angle to the screw axis, and secondly enables screws to be inserted and removed when the body portion 2 is in position in the recess of the panel surface. Thus broken or otherwise damaged screws can be removed and replaced without the possibility of damage being caused to the panel.

What is claimed is:

1. A securing device for securing panels at right angles to each other, comprising a holding member adapted to be fitted in a recess provided in a major surface of one of said panels, said holding member comprising a plug-like body portion having a front wall exposed at an edge of said one panel and positioned substantially flush therein, a chamber extending through the full length of the body portion from a first opening in the front wall to a second opening opposite the front wall, said chamber being adapted to retain a securing member within the body portion, the holding member also being provided with a top wall arranged to be exposed at a major surface of the panel and having a third opening therein extending into the body portion and connecting with said chamber, said third opening adapted to enable insertion of the securing member in the chamber and provide access for driving the securing member to engage the second panel, and draw it towards the first panel, and said second opening providing alternative access for insertion of the securing member in the chamber prior to positioning of the securing device in the panel recess, said second and third openings being separated by a bridge portion.

2. A securing device according to claim 1 wherein said chamber extends through the full width of the body portion and forms an opening therein opposite the front wall, said opening providing alternative access for insertion of the securing member in the chamber prior to positioning of the securing device in the panel recess.

3. A securing device according to claim 1 wherein the opening in the top wall is provided with a chamfer at a relatively rearward edge thereof.

4. A securing device according to claim 1 wherein the securing member is a screw adapted to be driven by a screwdriver positioned at an angle to the screw axis.

5. A securing device according to claim 4 wherein the diameter of the opening in the front wall is smaller than the bore of the chamber, thereby providing means by which the head of the screw is retained inside the body portion when the screw is driven.

6. A securing device for securing panels at right angles to each other, comprising a holding member adapted to be fitted in a recess provided in a major surface of one of said panels, said holding member comprising a plug-like body portion having a front wall arranged to be exposed at an edge of said one panel and positioned substantially flush therewith, said front wall having an opening therein extending axially in the body portion away from the front wall and defining a chamber for retaining a securing member within the body portion, said chamber extending through the full width of the body portion and forming an opening therein opposite the front wall, said opening providing alternative access for insertion of the securing member in the chamber prior to positioning of the securing device in the panel recess, the chamber having on its inner walls one or more longitudinal ribs arranged to locate and retain the securing member in position in the chamber, the holding member having a top wall arranged to be exposed at a major surface of the panel and having an opening therein extending into the body portion and connecting with said chamber, the opening in the top wall enabling insertion of the securing member in the chamber and providing access for driving the securing member to engage the second panel, and draw it towards the first panel.

7. A securing device for securing panels at right angles to each other, comprising a holding member adapted to be fitted in a recess provided in a major surface of one of said panels, said holding member comprising a plug-like body portion having a front wall arranged to be exposed at an edge of said one panel and positioned substantially flush therewith, said front wall having an opening therein extending axially in the body portion away from the front wall and defining a chamber adapted to retain a screw within the body portion, the holding member also being provided with a top wall arranged to be exposed at a major surface of the panel and having an opening therein extending into the body portion and connecting with said chamber, the opening in the top wall being adapted to enable insertion of the securing member in the chamber and provide access for driving the screw by screwdriver positioned at an angle to the screw axis to engage the second panel, and draw it towards the first panel, the diameter of the opening in the front wall being smaller than the bore of the chamber, thereby providing screw-head retaining means by which the head of the screw is retained inside the body portion when the screw is driven and wherein the screw-head retaining means is provided as a step formed by the change in diameter, a portion of said step being chamfered to facilitate insertion of the screw in the chamber via the top face opening.

* * * * *